(12) United States Patent
Savicki, Jr. et al.

(10) Patent No.: US 8,946,576 B2
(45) Date of Patent: Feb. 3, 2015

(54) QUIET ELECTROMECHANICAL SWITCH DEVICE

(71) Applicant: Pass & Seymour, Inc., Syracuse, NY (US)

(72) Inventors: Gerald R. Savicki, Jr., Canastota, NY (US); Richard M. Rohmer, Jordan, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 145 days.

(21) Appl. No.: 13/832,760

(22) Filed: Mar. 15, 2013

(65) Prior Publication Data

US 2014/0138235 A1     May 22, 2014

Related U.S. Application Data

(63) Continuation-in-part of application No. 13/680,675, filed on Nov. 19, 2012.

(51) Int. Cl.
| | | |
|---|---|---|
| *H01H 19/00* | (2006.01) | |
| *H01H 21/00* | (2006.01) | |
| *H01H 23/16* | (2006.01) | |
| *H02G 3/12* | (2006.01) | |

(52) U.S. Cl.
CPC .............. *H01H 23/168* (2013.01); *H02G 3/12* (2013.01)
USPC ............ 200/558; 200/339; 200/574; 200/553

(58) Field of Classification Search
CPC .................................................... H01H 23/168
USPC .................. 200/558, 553, 339, 573, 574, 561
See application file for complete search history.

(56) References Cited

U.S. PATENT DOCUMENTS

| | | | | |
|---|---|---|---|---|
| 4,847,458 | A * | 7/1989 | Martin .......................... | 200/561 |
| 4,931,762 | A * | 6/1990 | Fierro ............................. | 337/66 |
| 5,285,039 | A * | 2/1994 | Satoh ............................ | 200/563 |
| 5,880,420 | A | 3/1999 | Rohmer et al. | |
| 6,448,515 | B1 * | 9/2002 | Rohmer et al. ............ | 200/50.28 |
| 6,891,117 | B1 * | 5/2005 | Gouhl et al. .................. | 200/339 |
| 6,919,523 | B1 * | 7/2005 | Lai ................................ | 200/402 |
| 8,178,809 | B2 * | 5/2012 | Bauer et al. .................... | 200/574 |
| 2010/0116636 | A1 * | 5/2010 | Bauer et al. .................... | 200/401 |

* cited by examiner

*Primary Examiner* — Kyung Lee
(74) *Attorney, Agent, or Firm* — Daniel P. Malley; Bond Schoeneck & King, PLLC

(57) ABSTRACT

The present invention is directed to a switch device that includes a first switch portion that is configured to rotate a first angular amount in a first direction about a first fixed axis of rotation and has a first pivot arm length. The first and second switch are coupled to the interface portion. The second switch portion rotates a second angular amount in a second direction and has a second pivot arm length. The second angular amount is greater than the first angular amount and a function of the first pivot arm length and the second pivot arm length. A set of switch contacts includes at least one fixed contact and a movable contact separated by a predetermined minimum distance that is a function of the first pivot arm length and the second pivot arm length.

50 Claims, 17 Drawing Sheets

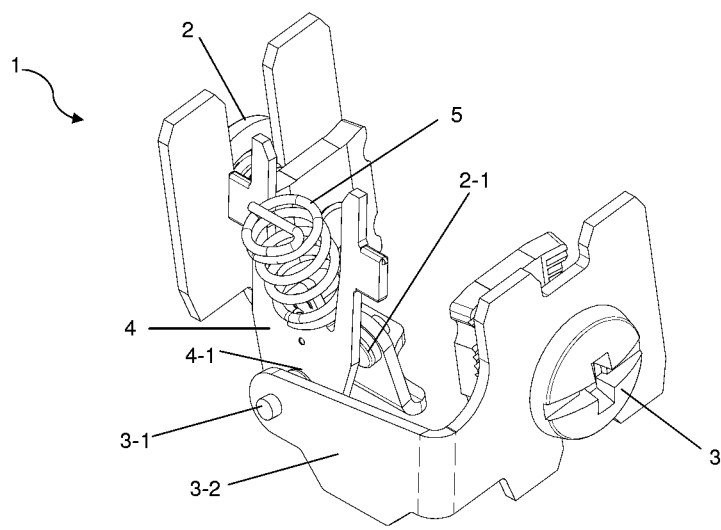
Fig. 1A
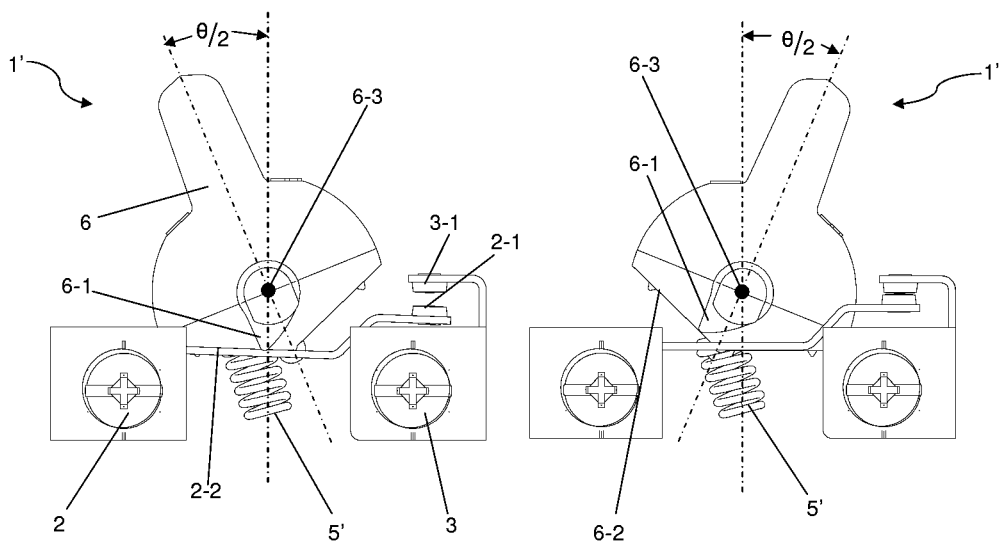
Fig. 1B
Fig. 1C

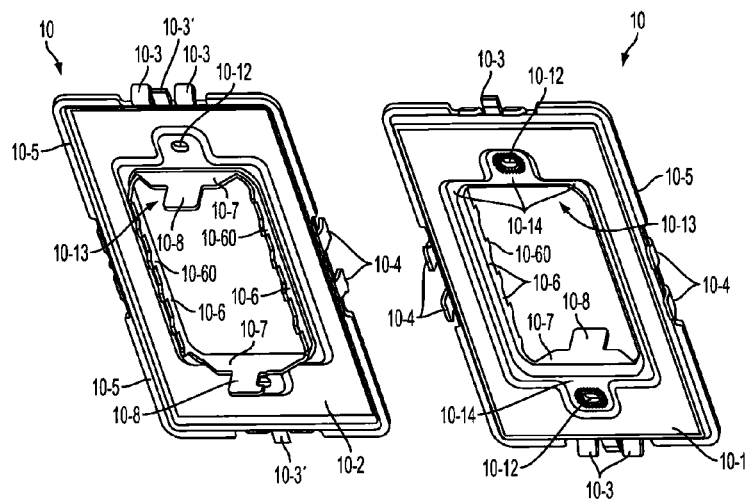
FIG. 2A    FIG. 2B
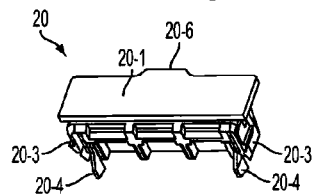 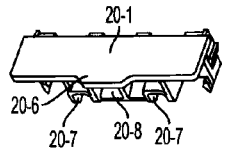
FIG. 3A    FIG. 3B
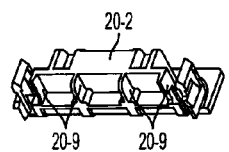 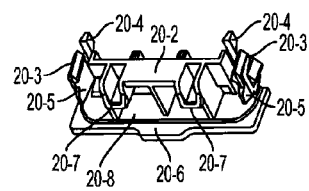
FIG. 3C    FIG. 3D

QUIET ELECTROMECHANICAL SWITCH DEVICE

CROSS-REFERENCE TO RELATED APPLICATIONS

This is application is a continuation-in-part of U.S. patent application Ser. No. 13/680,675 filed on Nov. 19, 2012, the content of which is relied upon and incorporated herein by reference in its entirety, and the benefit of priority under 35 U.S.C. §120 is hereby claimed.

BACKGROUND OF THE INVENTION

1. Field of the Invention

The present invention relates generally to switching devices, and particularly to electromechanical switching devices.

2. Technical Background

A single pole single throw (SPST) switch is an electrical device that is an ON/OFF switch in that it either allows current to flow through a circuit or it interrupts that current flow. Wall switches are often configured as SPST switches that are used to turn electrical loads (such as lights) ON or OFF. Thus, when a person enters a darkened room they actuate the switch to turn the lights ON, and when they leave that room, they turn the lights OFF.

A single pole double throw (SPDT) switch, on the other hand, may be used to divert current from one circuit path to another circuit path, and vice-versa. When this type of switch is used to control lighting loads, it is often used in tandem with another SPDT switch such that the lights can be turned ON or OFF from two different locations. For example, one often finds one SPDT switch at one end of a hallway and a second SPDT switch at the opposite end of the hallway. Thus, the arrangement allows the person to turn the lights ON, traverse the hallway safely, and then turn the lights OFF at the other end of the hall. Both the SPST switch and the SPDT switch are commonly implemented as electromechanical switches that employ moving mechanical parts to make or break the electrical switch contacts.

In reference to FIG. 1A, a simplified view of a pendulum-type toggle switch 1 is shown. This type of device usually employs a paddle switch (not shown) that is used by the operator to throw the switch into the desired state. Paddle switches exhibit a relatively small amount of rotation (e.g., less than 10°) and can be actuated with a touch of the finger. Accordingly, many consumers find them convenient and easy to use. As shown herein, switch 1 includes two traveler terminals 2, 3 and a switch actuation pendulum 4 coupled therebetween. The switch pendulum 4 typical rests in a cradle that is connected to line hot. Thus, if one traveler is connected to the premise wiring the switch implements a SPST switch; however, if both travelers (2, 3) are properly connected to premise wiring, then the switch 1 operates as a SPDT switch because operation of the switch diverts current from the hot line to either traveler 2 or traveler 3. When a user depresses the switch paddle (not shown), a force greater than the make force of spring 5 is applied to drive the pendulum contact from engaging traveler contact 3-1 to engaging the opposing traveler contact 2-1. When the pendulum contact 4-1 strikes the opposing traveler contact 2-1, the closing of the contacts (2-1, 4-1) creates a loud noise that some consumers find annoying. Stated briefly, many consumers like the convenience of the paddle switch actuator but do not like the associated noise. Hence, one drawback to the switch mechanism depicted in FIG. 1A relates to the loud actuation noise it produces when the pendulum contact strike the traveler contact.

Referring to FIG. 1B, a cross-sectional view of a toggle switch 1' is disclosed. Toggle switch 1' is shown to include a toggle switch actuator 6 that has an axis of rotation about the trunion 6-3. The switch 6 also includes a cam element 6-1 that extends from the trunion 6-3. In FIG. 1B, the cam element 6-1 is pressing against the traveler contact arm 2-2 such that contacts 2-1 and 3-1 are open. In doing so, the toggle actuator 6 is rotated an amount $\theta/2$, wherein $\theta$ can be as much as 40-60°. Because the toggle actuator 6 rotates approximately 40-60° when moving between switch positions, the spring force associated with spring 5' is relatively high. Thus, the switch contacts (2-1, 3-1, and 4-1) are relatively quiet. Nonetheless, because the toggle switch actuator must rotationally move such a large distance (i.e., about 40-60°), a user must purposely hold the toggle switch between their thumb and forefinger and rotate the toggle switch actuator in order to change switch states. More often than not, users are in a hurry and simply bend their index finger and snap their wrist in a single motion to actuate the switch. When this happens, a relatively large force is applied to rotate the toggle actuator and it often causes the flat bottom portion 6-2 of the toggle switch actuator 6 to loudly strike the portion of the switch housing under it. Even though the contacts are relatively quiet, the sound advantage is nonetheless negated. Thus, the drawbacks associated with this switch type relate to the large angle of rotation between switch positions and the loud noise that is sometimes associated with actuating the switch.

Heretofore, the solution to the above stated problems was to employ a switch mechanism that uses an electronic switch actuator, such as a push button switch. A push button switch can be operated with a flat push actuation plate or with a paddle switch actuator. Moreover, the push button switch makes substantially no noise when it is actuated. However, there are drawbacks associated with electronic switches. Electronic switches are relatively expensive and not as robust as electro-mechanical switches. Accordingly, electronic switches are not as reliable and must be replaced more frequently than electro-mechanical switches.

Turning now to another consideration, there are several drawbacks associated with conventional installation methods and conventional protective electrical wiring devices. Conventional protective electrical wiring devices often do not make efficient use of space. In addition, mounting the wiring device's ground strap to the device box is tedious, time consuming, and therefore costly. The same can be said of mounting the cover plate to the electrical wiring device. Moreover, in multi-gang installations, the finished look is often ragged because the plurality of electrical devices and their respective cover plates are typically not in alignment. This misalignment can be, and very often is, in all three dimensions. Retrofitting an electrical installation can also be problematic from the standpoint of the finished look because the device box, or an old work box, may not be precisely aligned to the plane of the wall surface. This is especially true if the wall surface itself is uneven. After remodeling a space, homeowners often seek to replace an existing wall plate with one that better matches the new décor. Thus, a homeowner may inadvisably remove the faceplate cover from an energized wiring device and inadvertently become exposed to a shock hazard from the "hot" electrical wiring.

What is needed, therefore, is an electromechanical switch mechanism that obviates the drawbacks articulated above. In particular, what is needed is an electromechanical switch that is substantially quiet and easy to operate, having a small angle of rotation between switch positions. A switch of this type is also needed that can be employed in a number of different form factors including one suitable for use in a modular framing system such that it does not require fasteners to be securely installed within the device box.

SUMMARY OF THE INVENTION

The present invention addresses the needs described above by providing electromechanical switch mechanism that obviates the drawbacks articulated above. In particular, what is needed is an electromechanical switch that is substantially quiet and easy to operate, having a small angle of rotation between switch positions. Moreover, the switch of the present invention can be employed in a number of different form factors including a form factor suitable for use in a modular framing system.

One aspect of the present invention is directed to a switch device that includes a housing having a switch frame and a back body portion. A first switch portion is coupled to a first fixed axis of rotation, the first switch portion being configured to rotate a first angular amount in a first direction about the first fixed axis of rotation in response to a user actuation of the first switch portion. The first switch portion further includes an interface portion, the distance between the first fixed axis of rotation and the interface portion defining a first pivot arm length. A second switch portion is coupled to the interface portion and coupled to a second fixed axis of rotation. The second switch portion is configured to rotate a second angular amount in a second direction about the second fixed axis of rotation in response to the rotation of the first switch portion. The distance between the second fixed axis of rotation and the interface portion defines a second pivot arm length. The second angular amount is greater than the first angular amount and a function of the first pivot arm length and the second pivot arm length. A set of switch contacts includes at least one fixed contact and a movable contact. The movable contact is separated from the at least one fixed contact by a predetermined minimum distance in response to a camming element disposed on the second switch portion rotating in the second direction. The predetermined minimum distance is a function of the first pivot arm length and the second pivot arm length.

In another aspect, the present invention is directed to a switch device that includes a housing having a hot terminal configured to be coupled to a source of AC power and at least one traveler terminal configured to be coupled to an electrical load. A switch input mechanism is coupled to the housing at a first fixed axis of rotation. The switch input mechanism is configured to rotate a first angular amount in a first direction about the first fixed axis of rotation in response to a user actuation of the switch input mechanism. The switch input mechanism further includes an interface portion disposed at an end thereof, the distance between the first fixed axis of rotation and the interface portion defining a first pivot arm length. A switch actuator is coupled to the switch input mechanism at the interface portion and coupled to the housing at a second fixed axis of rotation. The switch actuator is configured to rotate a second angular amount in a second direction about the second fixed axis of rotation in response to the rotation of the switch input mechanism, the distance between the second fixed axis of rotation and the interface portion defining a second pivot arm length. The second angular amount is greater than the first angular amount and a function of the first pivot arm length and the second pivot arm length. A set of switch contacts includes at least one fixed contact coupled to the hot terminal and a movable contact connected to the at least one traveler terminal. The movable contact is separated from the at least one fixed contact by a predetermined minimum distance in response to a cam element disposed on the switch actuator rotating in a second direction. The predetermined minimum distance is a function of the first pivot arm length and the second pivot arm length.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIGS. 1A-1C provide various views of conventional electromechanical switches;

FIGS. 2A-2B provide perspective views of a frame member in accordance with the present invention;

FIGS. 3A-3D provide perspective views of a modular alignment connector in accordance with the present invention;

DETAILED DESCRIPTION

Figure 4A:
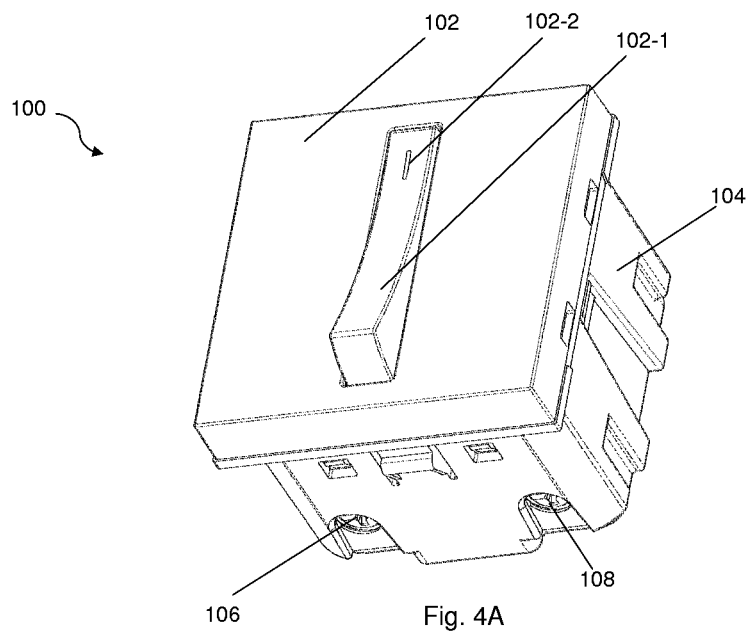
FIGS. 4A-4B provide perspective front and rear views of the switch device in accordance with one embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the switch of the present invention is shown in FIG. 4, and is designated generally throughout by reference numeral 100.

As embodied herein, and depicted in FIGS. 2A-2B, perspective views of a frame member 10 in accordance with the present invention are disclosed. FIG. 2A is directed to the rear side 10-2 of the frame member 10, whereas FIG. 2B is directed to the front side 10-1 of the frame member 10. The frame member 10 is configured to "complete the electrical enclosure" when one or more modular electrical devices (30, 40 or 50) and/or modular alignment connectors 20 are properly installed within the frame opening 10-13 such that the device wall box interior is substantially inaccessible. Stated differently, instead of using a conventional wall plate to complete the enclosure, the frame member 10 is used to prevent individuals from being shocked or electrocuted by concealing all electrical wiring under the frame 10 within the device wall box interior.

Thus, a frame enclosure lip 10-5 is disposed around the perimeter of the frame 10. The frame enclosure lip 10-5 is configured to substantially abut the wall surface 1 (not shown in this view) such that a front edge of a properly installed wall box does not substantially touch the rear side 10-2 of the frame 10. This is true even when old work boxes are deployed. Old work boxes, of course, have flanges that are mounted to the outer surface of the wall surface 1. The frame enclosure lip 10-5 raises the rear surface 10-2 overtop the work box to avoid any interference with the flanges and prevent the frame 10 from contacting the wall surface 1.

As shown, the frame 10 includes a frame opening 10-13 that has an interior serrated edge or lip 10-6 that is configured to mate with the modular alignment conductors 20 and/or the electrical wiring devices 30, 40, 42 or 50 in the manner disclosed below. Once the electrical wiring device and/or the modular alignment connectors are installed within the frame opening 10-13, the enclosure is completed. The interior serrated lip 10-6 extends along lateral portions of the frame opening 10-13 to adjoin a connector landing element 10-7 disposed at either end of the frame opening 10-13. The interior serrated lips 10-6 and the connector landing elements 10-7 extend perpendicularly around the entire frame opening 10-12 to form a rim or skirt that is inserted inwardly within the device box interior during installation. Accordingly, the region under the rear frame surface 10-2 between the outer enclosure lip 10-5 and the interior rim (i.e., serrated lips 10-6 and landing 10-7) is disposed over the wall surface 1. Once the wall box fasteners 10-10 are inserted into the fastener slots 10-12 and tightened, the interior of the device box is accessed via the frame opening 10-13. After device installation, however, the frame opening 10-13 is completely occupied by some combination of modular wiring devices including switch 100 and/or modular alignment connectors 20 to thereby complete the enclosure. All of the wiring is under the frame assembly and cannot be accessed. Because the frame completes the overall enclosure, no wall plate need be employed by the present invention; the wall plate is replaced by an aesthetic overlay that can be removed at any time without exposing the homeowner to shock or electrocution. As its name suggests, the aesthetic overlay of the present invention may be comprised of a variety of decorator materials without regard to the structural considerations that are concomitant with completing the enclosure. Finally, because the frame of the present invention completes the overall enclosure, it may be employed with new construction, old construction or retrofits.

As embodied herein and depicted in FIGS. 3A-3D, perspective views of a modular alignment connector 20 in accordance with the present invention are disclosed. The modular alignment connector 20 is said to be modular because it adjusts and aligns the size of the frame opening such that various combinations of wiring devices (e.g., 30, 40, and 42) disposed in a variety of spatial orientations are used to complete the frame opening 10-13 when they are installed therein.

FIG. 3A shows a front major surface 20-1 of the modular alignment connector 20 (when it is inserted within the frame opening 10-13). The front major surface 20-1 of the modular alignment connector 20 has a width of approximately 11.2 mm and a length of about 45 mm. One pair of the alignment connectors 20 are the same size as a one-module electrical wiring device. The front major surface 20-1 includes a front connector flange 20-6 which is configured to fit within the frame connector seat 10-14 when the connector is inserted within the frame 10. The modular alignment connector 20 also includes bending snap arms 20-3 and spacer tangs 20-4 disposed on either side of the connector 20. A spacer channel 20-5 is disposed between the snap arm 20-3 and the spacer tang 20-4. As their name suggests, the snap arms 20-3 are used to "snap" the alignment connector 20 into the frame opening 10-13. Subsequently, the spacer tang 20-4 is pressed into the spacer channel 20-5 to lock the modular alignment connector 20 into the frame opening 10-13. The locked snap arms 20-3 retain the alignment connector 20 within the frame opening 10-13 thereafter. Stated differently, when a spacer tang 20-4 is inserted into a channel 20-5, the snap arm 20-3 can no longer deflect inwardly and thus cannot be removed from place. The snap connect assembly (20-3, 20-4, and 20-5) is configured to withstand at least 50 foot-pounds of pulling force.

Reference is made to U.S. patent application Ser. No. 13/680,675, which is incorporated herein by reference as though fully set forth in its entirety, for a more detailed explanation of the frame member 10.

FIG. 3B shows the modular alignment connector 20 rotated 180° with respect to the view provided by FIG. 3A. The front stabilizing plate 20-6 and the rear connector flanges 20-7 form a connector channel 20-8 that is configured to grip the frame connector landing 10-7 (See FIGS. 2A-2B). The front stabilizing plate 20-6 is seated on the frame connector seat 10-14 when the alignment connector 20 is inserted into the frame opening 10-13. The purpose of the front stabilizing plate 20-6 is to help the connector 20 retain its position within the frame opening 10-13 by preventing it from being pushed inwardly and through frame opening 10-13.

FIG. 3C is a rear view of the modular alignment connector 20. This view shows a rear major surface 20-2 that is supported underneath by device stop elements 20-9. Like the serrated stop elements 10-60 of the serrated lip 10-6, the device stop elements 20-9 are configured to engage and mate with the device snap elements formed in the modular wiring device housing (See elements 30-2, 40-2, etc., depicted in FIGS. 5) to complete the electrical enclosure. This snap-fit arrangement fixes the modular wiring device (30-2, 40-2) within the opening 10-13 such that it cannot move laterally or longitudinally within the frame opening 10-13 when snapped in place. Stated differently, the interior serrated lips 10-6 and device stop elements 20-9 serve to secure and align the electrical switch 10 and other wiring devices within the frame opening 10-13.

FIG. 3D shows the modular connector 20 rotated 180° with respect to the view provided by FIG. 3C. When inserted into the frame opening 10-13, the rear stabilizing plate 20-7 bears against edges of the connector landing 10-7 (See FIGS. 2A-2B). Again, the front stabilizing plate 20-6 and the rear stabilizing plate 20-7 form a channel 20-8 that restricts the movement of the modular alignment connector 20 after being seated on the connector seat 10-14. As the connector 20 is moved to this seated position, bending snap arms 20-3 are deflected inwardly by the interior serrated lip 10-6 until they clear and snap back outwardly into the serrations. Again, the bending snap arms 20-3 prevent the connector 20 from sliding or moving out of its seated position.

Reference is made to U.S. patent application Ser. No. 13/680,675, which is incorporated herein by reference as though fully set forth in its entirety, for a more detailed explanation of the modular alignment connector 20.

Figure 4B:
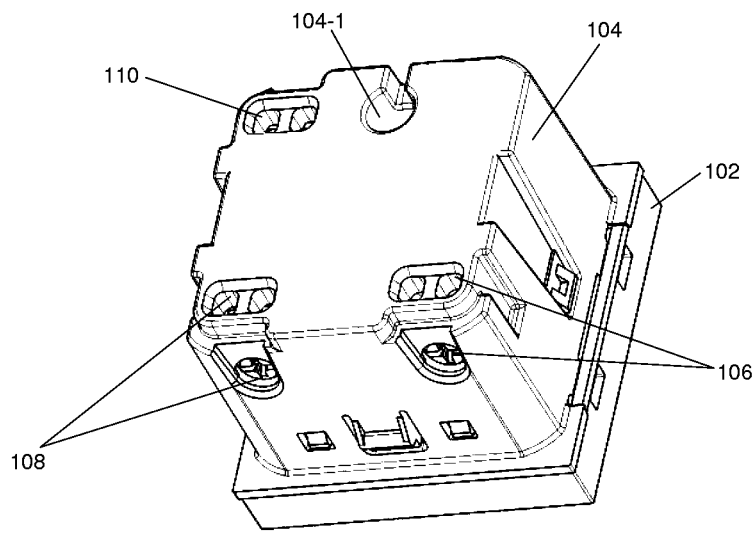

As embodied herein, and depicted in FIGS. 4A-4B, perspective front and rear views of the switch device 100 in accordance with one embodiment of the present invention is disclosed. FIG. 4A provides a perspective front view of a two-module switch device 100 that is configured to be mounted within the frame 10 with an alignment connector 20 disposed on either side thereof. See FIGS. 2-3. As noted above, the modular switch 100 can be disposed within the frame 10 in any orientation. The switch device 100 includes an aesthetic cover 102 that includes a user actuator 102-1 disposed therein. The aesthetic switch actuator 102-1 may include a lens element 102-2 formed therein. The aesthetic cover member 102 and the aesthetic switch actuator 102-1 may be removed and replaced by a different cover 102 and user switch actuator 102-1. For example, a consumer may desire to change the color of the aesthetic cover 102 (and/or the aesthetic switch actuator 102-1) after painting or remodeling the room that the switch 100 is disposed in. The present invention allows her to do so.

The aesthetic cover 102 is coupled to a back body member 104. A traveler terminal 106 and the line hot terminal 108 are disposed in, and accessible via, the back body member 104. Turning now to FIG. 4B, the back body member includes a second traveler terminal 110 disposed kitty corner to the traveler terminal 106. The back body member 104 may also include a light tunnel opening 104-1 which is configured to accommodate an insertable lighting element 140 (not shown in this view).

Figure 5:
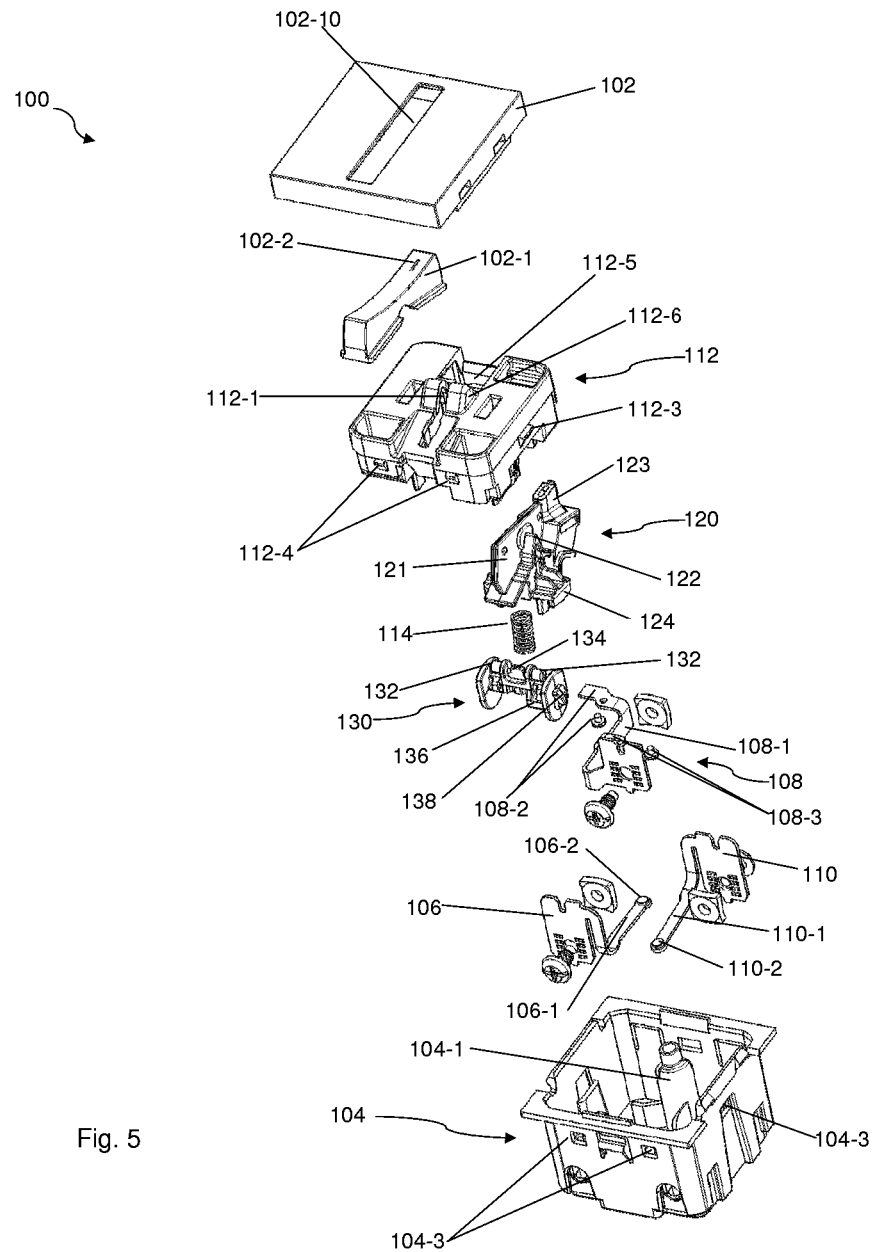
FIG. 5 is an exploded view of the switch device depicted in FIG. 4.

Referring to FIG. 5, an exploded view of the switch device 100 depicted in FIG. 4 is disclosed. Again, the switch device 100 includes a front cover 102 coupled to the back body 104. The front cover 102 includes a slot or opening 102-10 that accommodates the user switch actuator 102-1. The front cover 102 is coupled to the back body 104 indirectly by way of the frame enclosure 112. The frame enclosure 112 includes snap portions (112-3, 112-4) that are configured to snap into the snap openings (104-3, 104-4) formed in the back body member 104. Thus, when the frame enclosure 112 is inserted into the back body member 104, the snaps and the snap openings mate such that the frame enclosure 112 is connected to the back body 104. Stated differently, the frame enclosure 112 "completes the enclosure" of the switch device 100 such that user can remove either or both of the aesthetic front cover 102 or the aesthetic switch actuator 102-1 without risk of being exposed to any live wiring or live parts. The frame enclosure 112 also includes a slotted opening 112-1 that accommodates the functional actuator 120, and a wider opening 112-5 that accommodates the insertable lighting element 140 (not shown in this view).

In particular, the functional actuator 120 includes a fin portion 121 that extends through the pivot opening 112-1 such that the aesthetic switch actuator 102-1 can be coupled thereto. The frame enclosure 112 also includes a pivot mount 112-6 that accommodates the rotatable trunion portions 122 formed on either side of the functional actuator 120. When the user depresses the aesthetic switch member 102-1, it causes the functional switch actuator 120 to rotate in response to the force applied by the user. The functional actuator 120 further includes a light funnel 128 formed at one end thereof. The light funnel 128 directs light that is emitted by the insertable lighting device 140 (not shown in this view) to the lens element 102-2 formed in the aesthetic switch actuator 102-1. A relatively wide skirt portion 124 is formed at the bottom of the functional actuator 120 and includes slot members 126 (not visible in this view) there beneath; the slot members accommodate the gear actuation pins 132, which are described in more detail below. A central detent 127 (not visible in this view) is formed in the underside of the functional switch actuator 120. The detent 127 accommodates the switch spring 114.

The device 100 also includes a gear actuator 130 that is configured to multiply the rotational movement of the functional actuator 120 such that the interrupting contacts open safely and properly. As noted above, the gear pins 132 are inserted into slots 126 and are allowed to slide within the slot 126 when the joint (slot 126, pins 132) rotates during the actuation of the switch. A central spring seat 134 is formed in the gear multiplier 130 and accommodates the lower portion of the spring 114. Thus, one end of the spring is disposed in detent 127 and the other end is disposed on the seat 134. Trunions 138 are disposed outboard of the gear 130 and fixedly mate with portions 112-2 (not visible in this view) of the frame enclosure 112. Finally, cam actuators 136 are formed in the gear multiplier 130 and are configured to drive the switch contacts between switch states.

The switch contacts, of course, are disposed in the bottom of the back body member 104. They are part of an assembly that also includes the hot contact terminal 108. The terminal 108 includes a contact arm 108-1 that includes two fixed contacts (108-2, 108-3) that extend therefrom. A traveler terminal 106 is also disposed within the back body 104 at a position adjacent to the hot terminal 108 such that its flexible cantilever arm 106-1 positions a traveler contact 106-2 next to fixed hot contact 108-2. Another traveler terminal 110-1 disposed on the opposite side of the back body 104 includes a flexible cantilever arm 110-1 that positions traveler contact 110-2 next to the fixed hot contact 108-3. Note that the cantilever arms (106-1, 110-1) are pre-biased to make electrical contact with their respective fixed contacts (108-2,108-3) in the closed position. Unless the gear cam 136 is pressing against a given cantilever arm (106-1 or 110-1), the traveler contact (106-2 or 110-2) and the fixed contact (108-2 or 108-3, respectively) will make electrical contact in the closed position.

The switch device 100 can be employed as either a SPST switch or as a SPDT switch. In the first case, a SPST switch is implemented by not using one of the traveler terminals (i.e., a traveler wire is not connected to the unused traveler terminal). If both traveler terminals are connected to respective traveler wires, then the switch 100 is configured as a SPDT switch. Of course, for an SPST switch, one of the traveler terminals may be omitted.

Figure 6A:
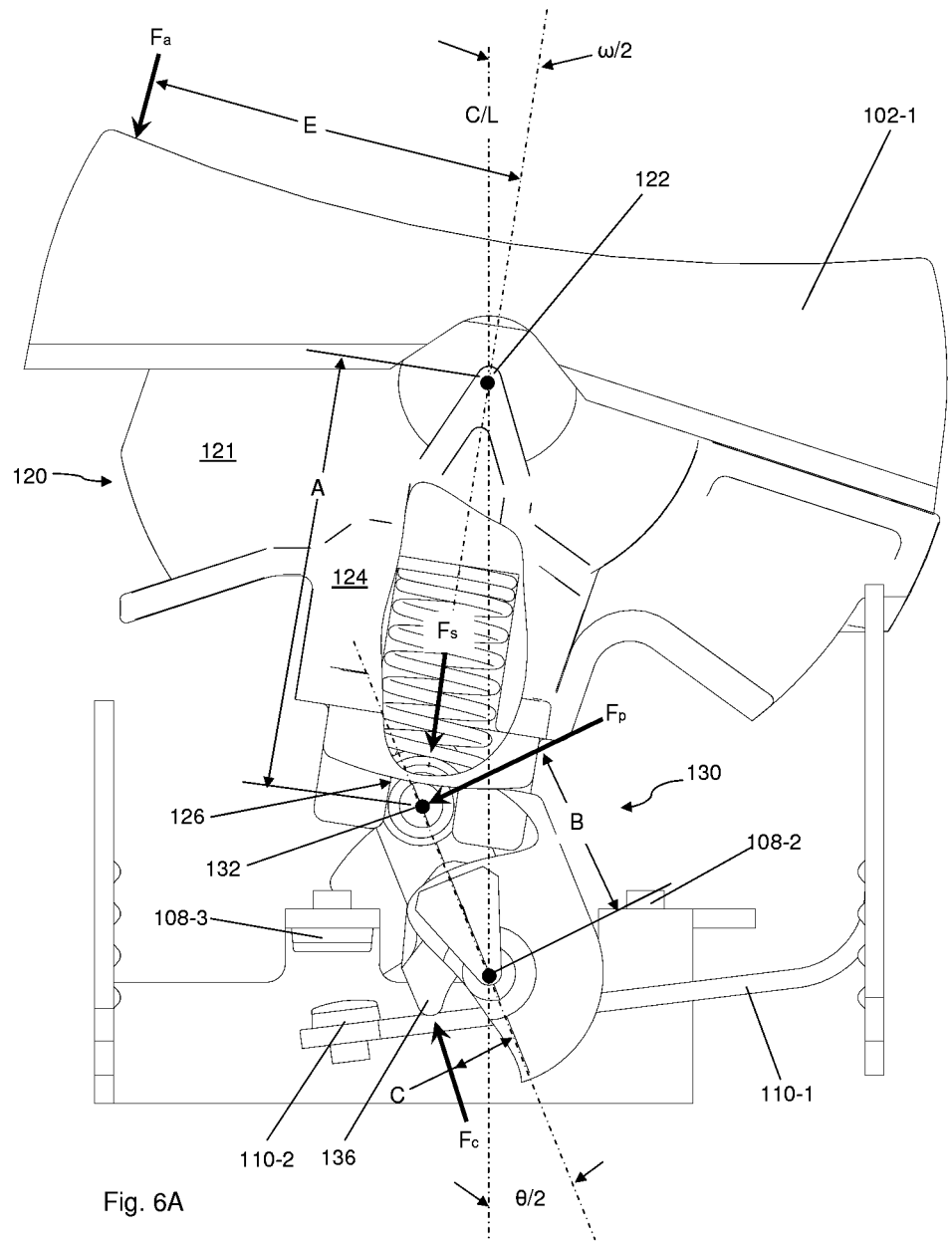
FIGS. 6A-6B are a diagrammatic depictions of the switch mechanism shown in FIG. 5.
Figure 6B:
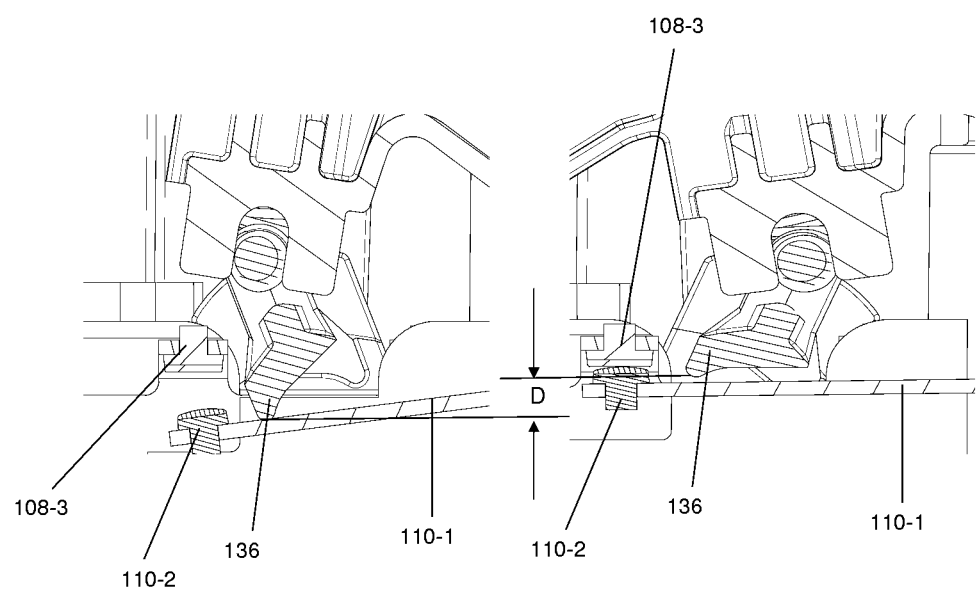

As embodied herein and depicted in FIGS. 6A-6B, a diagrammatic depiction of the switch mechanism (120, 130) shown in FIG. 5 is disclosed. The aesthetic switch cover 102-1 is fitted over and connected to the fins 121 of the functional switch actuator 120. The skirt 124 of the functional switch actuator 120 provides a region that accommodates the switch spring 114 and the gear pins 132. Note that the gear pins 132 are disposed within their respective slots 126 (not shown in this view) to form a laterally movable joint in the manner described above. The multiplier gear 130 is shown to include trunions 138 that are snapped into respective fixed joints (not shown in this view) formed in the frame enclosure 112.

Note that the functional switch trunions 122 of the functional switch actuator 120 and the gear trunions 136 of the multiplier gear 130 are vertically aligned along the central axis "CL." Again, both of the trunions (122, 136) represent fixed points (i.e., they can rotate within their respective sockets but cannot move laterally). On the other hand, the joints formed by the gear pins 132 and their respective slots 126 (not shown in this view) are substantially free to pivot.

The distance between the switch trunions 122 and gear pins 132 represents the length of a pivot arm "A." The distance between gear trunions 138 and gear pins 132 represents the length of another pivot arm "B." The ratio of A/B defines the rotational multiplier of gear 130. Stated differently, the relatively small angle of rotation "ω" performed by the functional switch actuator 120 is multiplied by the gear multiplier 130 to provide a relatively large angle of rotation "θ" performed by the cams 136 such that contact 110-2 separates from fixed contact 108-1 a predetermined minimum safe distance "D" that ensures safe and proper switch functionality. In one embodiment of the present invention, the minimum distance is greater than or equal to 0.100 inches.

Note that the length of pivot arm "B" is fixed, but the length of pivot arm "A" varies as pin 132 moves upward and downward within the slot 126 as the switch is rotated. The variable length of pivot arm A within the slot 126 provides the freedom that the switch mechanism requires for rotation.

The mechanism depicted in FIG. 6A-B ensures that the actuation of the switch device 100 is substantially quiet. The user need only apply a relatively small force to actuate the user switch portion (102-1) since it need only rotate a small amount (i.e., to is approximately 18°). Thus, unlike the springs used in conventional pendulum or toggle switches (See Background), the spring 114 does not need to be especially robust. Moreover, the cams 136 do not allow the contacts (e.g., 108-3, 110-2) to snap shut. Accordingly, the switch device 100 is substantially silent during switch actuation.

As noted above, the gear multiplier 130 is configured to multiply the functional switch rotation (e.g., ω equals approximately 18°) by providing a relatively large amount of rotation (e.g., 0 equals approximately 44°) to the gear cams 136. Thus, the ratio of A/B is about 2.4 in the non-limiting example provided herein. Note also that the distance from the center axis CL to the actuation region on the aesthetic switch 102-1 is about distance "E". Thus, if the user applies an actuation force $F_a$, the moment arm is equal to $F_a \times E$. In order for the functional switch 120 to rotate, the force $F_p$ on gear pins 132 must be overcome such that the following relationship holds:

$$F_a \times E > F_p \times A,$$

The force $F_p$ is of course the force applied at the gear pins 132. The force $F_p$ is a function of the spring force $F_s$ and is given by the following relationship:

$$F_p = F_s \cos(\omega/2 + \theta/2).$$

The spring force $F_s$ can be thought of as the minimum static force required to maintain the switch position in a given state:

$$F_s = (F_c \cdot C)/[\cos(\omega/2 + \theta/2) \cdot B],$$

where, C is the distance from the trunion 138 point of rotation to the point that the gear cam 136 contacts the cantilever arm 110-1. $F_c$ is the cantilever spring force exerted by the cantilever arm 110-1 that tends to close the switch contacts (110-2, 108-3). In order to open the contacts (110-2, 108-3), the multiplier gear 130 must rotate an angle θ to displace cam 136 a predetermined minimum distance "D" (See FIG. 6B) that ensures safe and proper switch function:

$$\theta = D/C \text{ (in radians)}.$$

The angular rotation θ can also be given in terms of ω:

$$\theta = (A/B) \cdot \omega.$$

The above relationships highlight the design tradeoffs associated with providing the gear multiplier 130 of the present invention. Because of the size and geometry of the switch device 100, the distance C must be kept relatively small in order for the switch to function quietly, smoothly and safely. In other words, the distance C must be kept relatively small to keep Fs small, to keep a quiet-functioning switch.

Figure 7A:
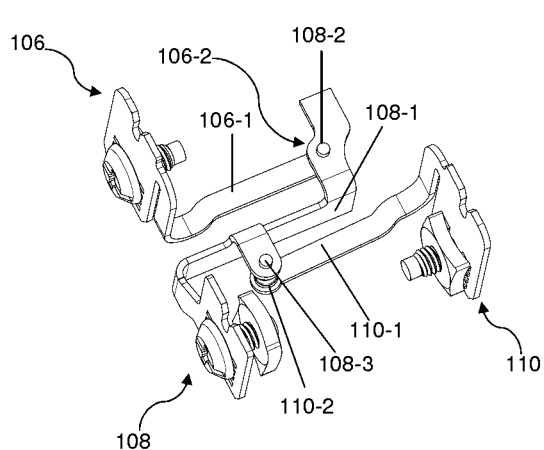
FIGS. 7A-7B are perspective views of the switch contacts depicted in FIG. 5.
Figure 7B:
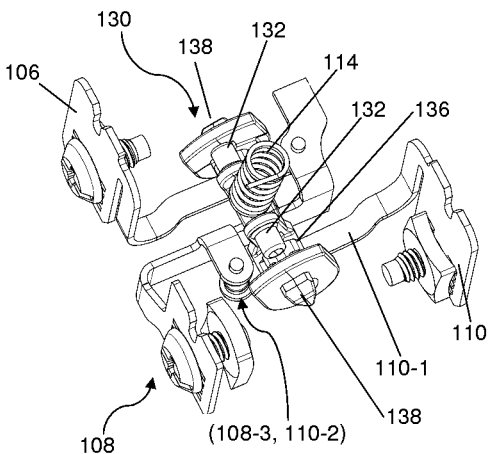

Referring to FIGS. 7A-7B, perspective views of the switch contacts depicted in FIG. 5 are disclosed. This view clearly shows the configuration of the hot terminal structure 108. In particular, the hot line terminal 108 includes a contact arm 108-1 that provides a fixed contact 108-3 at a mid-portion thereof, and another fixed contact 108-2 at the end thereof. As described previously, the fixed contact 108-3 is configured to mate with the traveler contact 110-2 which is disposed at the end of the flexible cantilever arm 110-1 associated with traveler terminal 110. The fixed contact 108-2 is configured to mate with the traveler contact 106-2 (not visible in this view) which is disposed at the end of the flexible cantilever arm 106-1 associated with the traveler terminal 106.

FIG. 7B shows the gear multiplier 130 disposed overtop the switch contact arrangement (106, 108, and 110). The switch spring 114 is disposed over the seat portion 134 at an angle ω/2 relative to the central axis CL (not shown in this view) and the gear multiplier is disposed at an angle θ/2 relative to the central axis. The gear cams 136 (not visible) are disposed under the pins 132 and over the cantilevered arms (106, 110). Essentially, when the gear multiplier 130 rotates in one direction, the cam 136 deflects cantilever arm 106-1 to open one switch contact pair (106-2, 108-2) while the other switch contact pair (108-3, 110-2) is being closed. Similarly, when the gear multiplier 130 rotates in the opposite direction, the other cam 136 deflects the cantilever arm 110 to open the contact pair (110-2, 108-3) while the other switch contact pair (108-2, 106-2) is being closed. These operations are explained below in more detail in the text associated with FIGS. 9 and 10.

Figure 8:
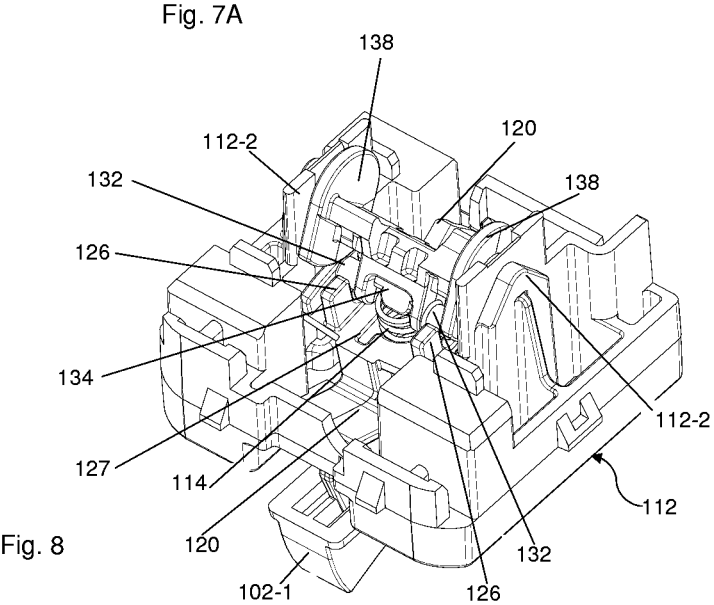
FIG. 8 is a bottom view of the functional switch actuator depicted in FIG. 5.

In reference to FIG. 8, a bottom view of the frame enclosure 112 and functional switch actuator 120 depicted in FIG. 5 is disclosed. The trunions 138 outboard of the gear multiplier 130 snap into the registration guides 112-2. At the same time, the gear pins 132 slide into the slots 126 formed in the functional switch actuator 120. As noted before, the switch spring 114 is disposed between the spring seat 134 and detent 127 formed in the underside of the functional switch actuator 120. Thus, the frame enclosure 112 accommodates both the functional switch actuator 120 and the gear multiplier 130 therein.

Figure 9:
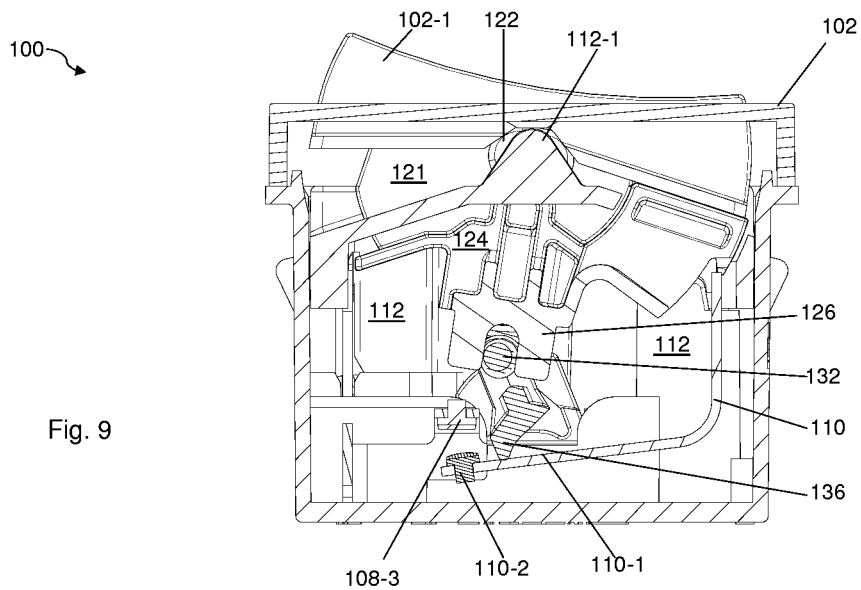
FIG. 9 is a cross-sectional view of the switch device depicted in FIGS. 4A-4B.

Referring to FIG. 9, a cross-sectional view of the switch device 100 depicted in FIGS. 4A-4B is disclosed. Again, the aesthetic switch actuator 102-1 is rotated about 9° to the right of the central axis that extends through the functional switch pivot point 112-1 and the trunion pivot point 138. The gear multiplier 130 is rotated about 22° to the right of the central axis such that the gear cam 136 is pressing down on the cantilever arm 110-1 to thus force apart the switch contact pair (108-3, 110-2). Note that because the central joint formed by gear pins 132 and slots 126 must rotate laterally, the gear pins 132 are somewhat free to move within the slots 126.

Figure 10:
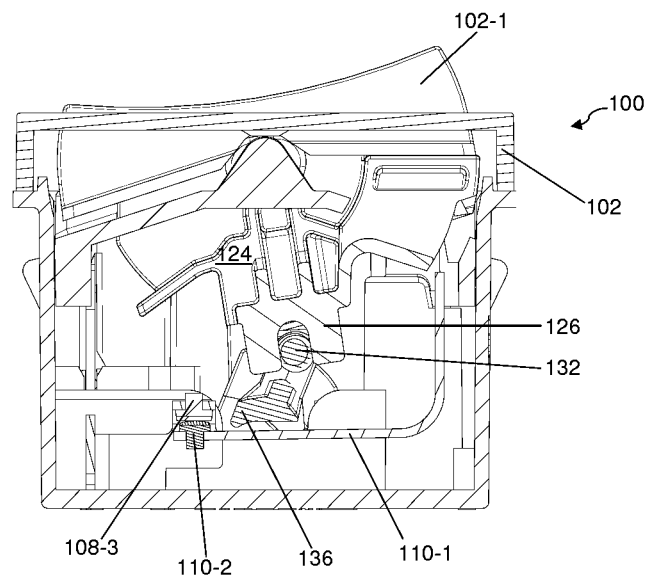
FIG. 10 is another cross-sectional view of the switch device depicted in FIGS. 4A-4B.

In reference to FIG. 10, another cross-sectional view of the switch device depicted in FIGS. 4A-4B is disclosed. In this view, the user has previously depressed the right side of the aesthetic switch actuator 102-1 in a downward direction to actuate the switch device 100. Now, the direction of rotation is reversed. The aesthetic switch actuator 102-1 is rotated about 9° to the left of the central axis and the gear multiplier is rotated about 22° to the left of the central axis such that the gear cam 136 is lifted above the cantilever arm 110-1. The spring force of the cantilever arm 110-1 forces the switch contact pair (108-3, 110-2) to the closed position. Of course, this necessarily means that the switch contact pair (106-2, 108-2) on the opposing side of the device 100 (not visible in this view) is open.

Figure 11:
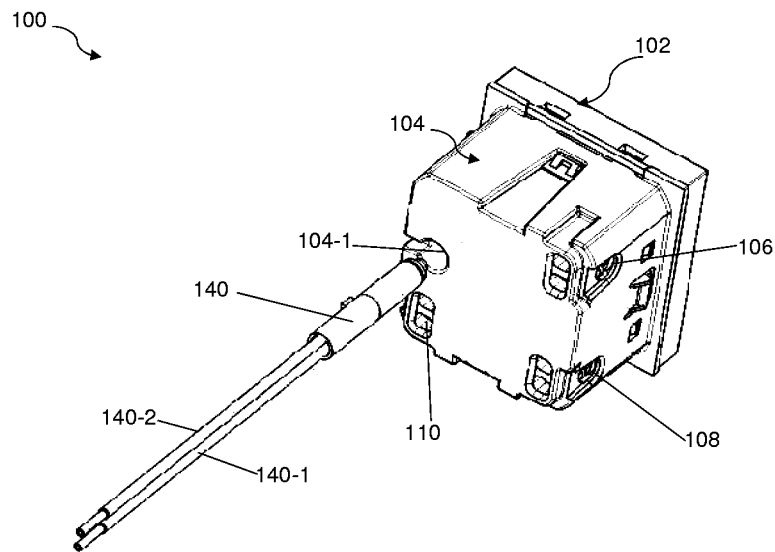
FIG. 11 is a rear perspective view of the switch device depicted in FIG. 4B in conjunction with an insertable lighting element.

Referring to FIG. 11, a rear perspective view of the switch device 100 (depicted in FIG. 4B) in combination with an insertable lighting element 140 is disclosed. In particular, the back body portion 104 is shown to include a light tunnel 104-1 which accommodates the lighting element 140. The lighting element 140 includes pig-tail leads (140-1, 140-2) which are employed to wire the lighting element 140 as appropriate. For example, if the lighting element is designed to be used as a locator light, the installer simply connects one lead to the hot line conductor and the other lead to the neutral conductor. If the switch 100 is installed as a SPST switch, and the intent is to turn the lighting element ON when the switch is OFF, then the installer would connect one lead 140-1 to traveler 106 and the other lead 140-2 to traveler 110. If the switch is installed as a SPST switch, and the intent is to turn the lighting element ON when the switch ON, then the installer may connect one lead 140-1 to the neutral and the other lead 140-2 to the traveler 106. Thus, when the hot terminal 108 is connected to the traveler terminal 106, the lighting element is ON. When the hot terminal is not connected, the lighting element is OFF. Alternatively, leads (140-1,140-2) may be connected from the hot terminal 108 to neutral in which case the lighting element is ON regardless of switch position. Alternatively, leads (140-1,140-2) may be connected from the hot terminal 108 to the traveler terminal 106 in which case the lighting element is ON when the two terminals are not connected, assuming the switch is connected to a load. If the switch is installed as a SPDT switch the lighting element may be connected between the travelers (106,110.)

Figure 12:
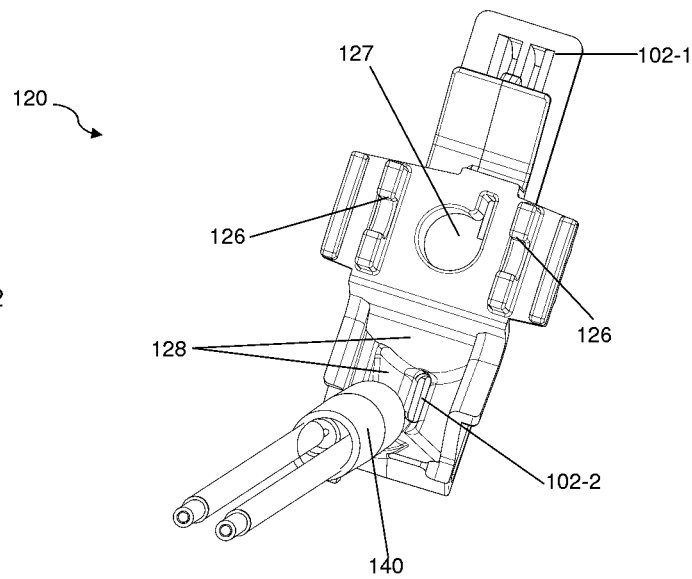
FIG. 12 is a detail view of the underside of the functional switch depicted in FIG. 5.

In reference to FIG. 12, a detail view of the underside of the functional switch 120 depicted in FIG. 5 is disclosed. The underside of the functional switch 120 clearly reveals the presence of the spring detent 127 mentioned previously. The slots 126 that accommodate the gear pins 132 are disposed on either side of the detent 127. The functional switch 120 further includes a light funnel 128 that is configured to direct light that is emitted by the lighting element 140 toward the lens element 102-2 formed in the top surface of the aesthetic switch actuator 102-1. Light funnel 128 focuses the light emitted from LED 140-3 to the comparatively smaller lens 102-2 preventing light leakage outside the lens area. In addition, light funnel 128 permits lens 102-2 to emit light from either switch position despite the fact that the lens travels with the aesthetic switch actuator 102-1 while at the same time LED 140-3 remains stationary.

Figure 13:
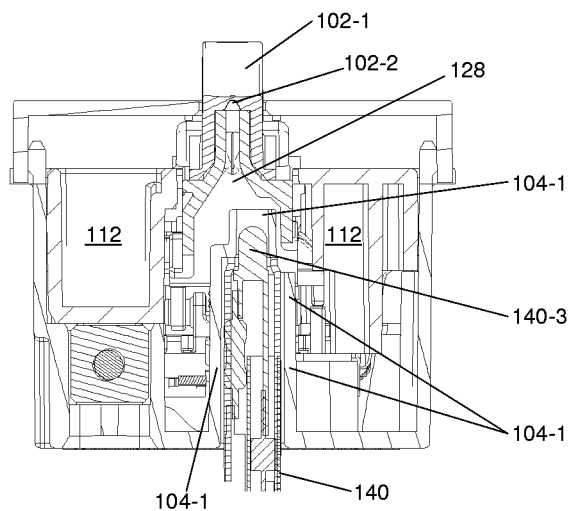
FIG. 13 is a cross-sectional view of the switch device depicted in FIGS. 4A-4B with the lighting element inserted therein.
Figure 14:
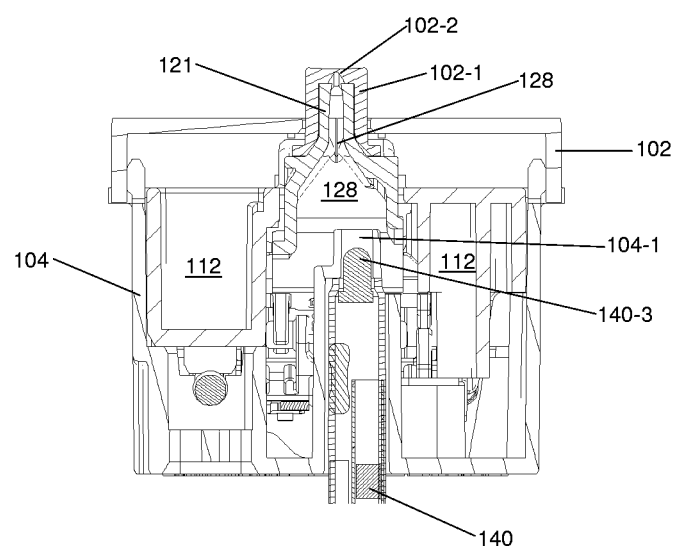
FIG. 14 is another cross-sectional view of the switch device depicted in FIGS. 4A-4B with the lighting element inserted therein.

Referring to FIG. 13, a cross-sectional view of the switch device 100 depicted in FIGS. 4A-4B is disclosed with the lighting element 140 inserted therein. In this view, the frame enclosure 112 is clearly shown as providing an interior space that accommodates the switch mechanism (102-1, 120, 130) as well as the lighting element 140. Specifically, the lighting element 140 is disposed within the light tunnel 104-1 formed in the back body member 104. An LED 140-3 is shown at the end of the lighting device 140 and is positioned at the end of the light tunnel 104-1 such that the emitted light is directed into a relatively wide portion of the light funnel 128. The light funnel 128 is tapered at an end portion thereof such that the emitted light is directed into the lens element 102-2. FIG. 14 is another cross-sectional view of the switch device depicted in FIGS. 4A-4B and shows the subject matter of FIG. 13 from a different vantage point.

Figure 15A:
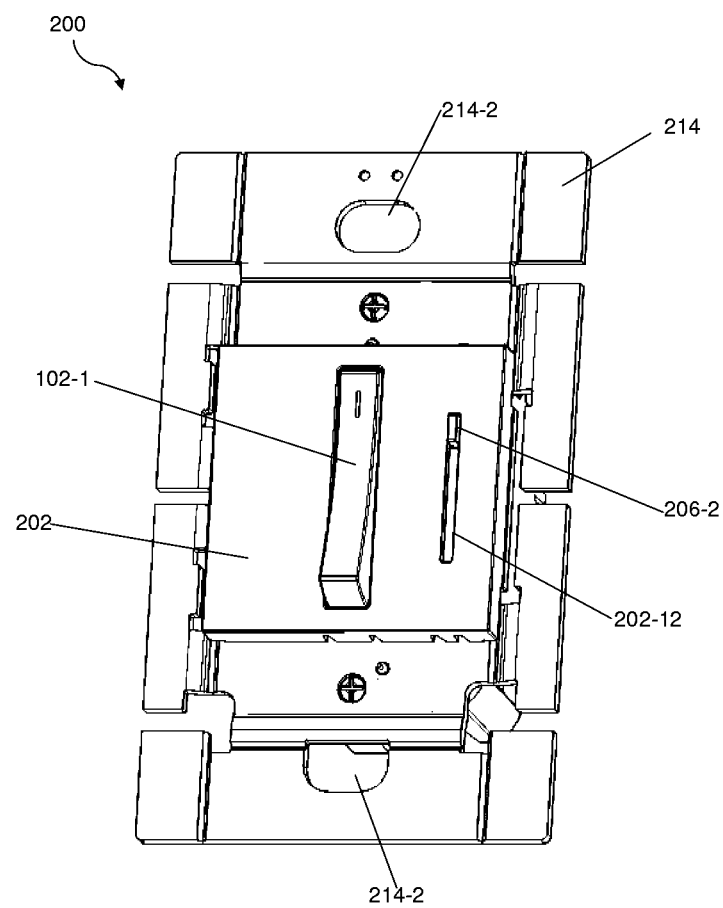
FIGS. 15A-15B provide perspective front and rear views of the switch device in accordance with another embodiment of the present invention.
Figure 15B:
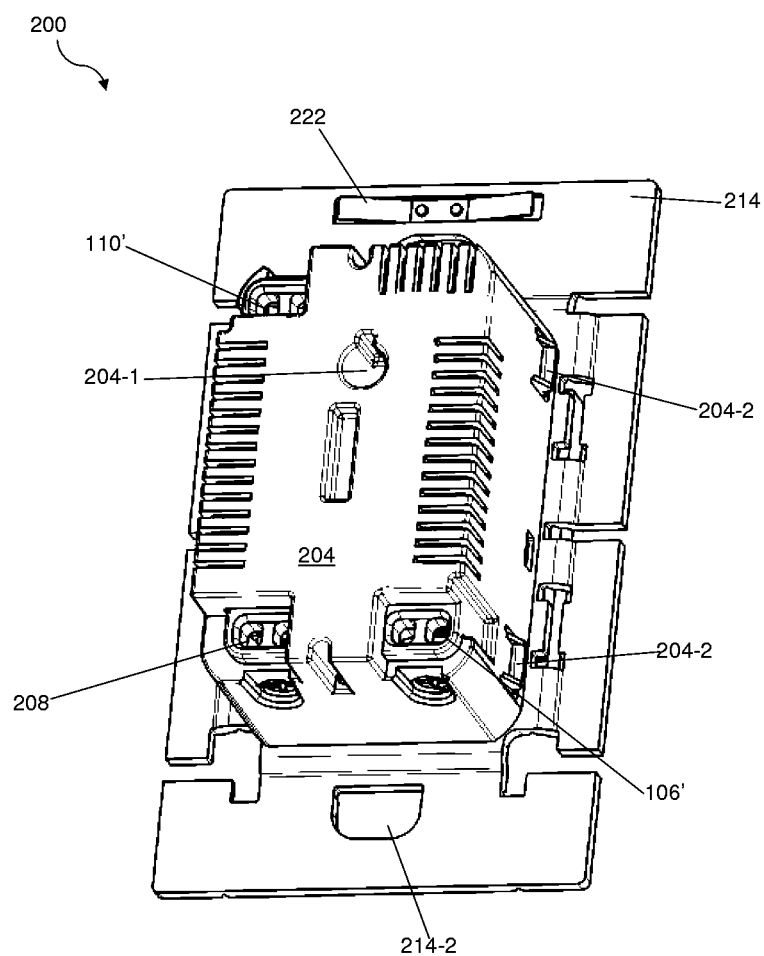
Figure 18:
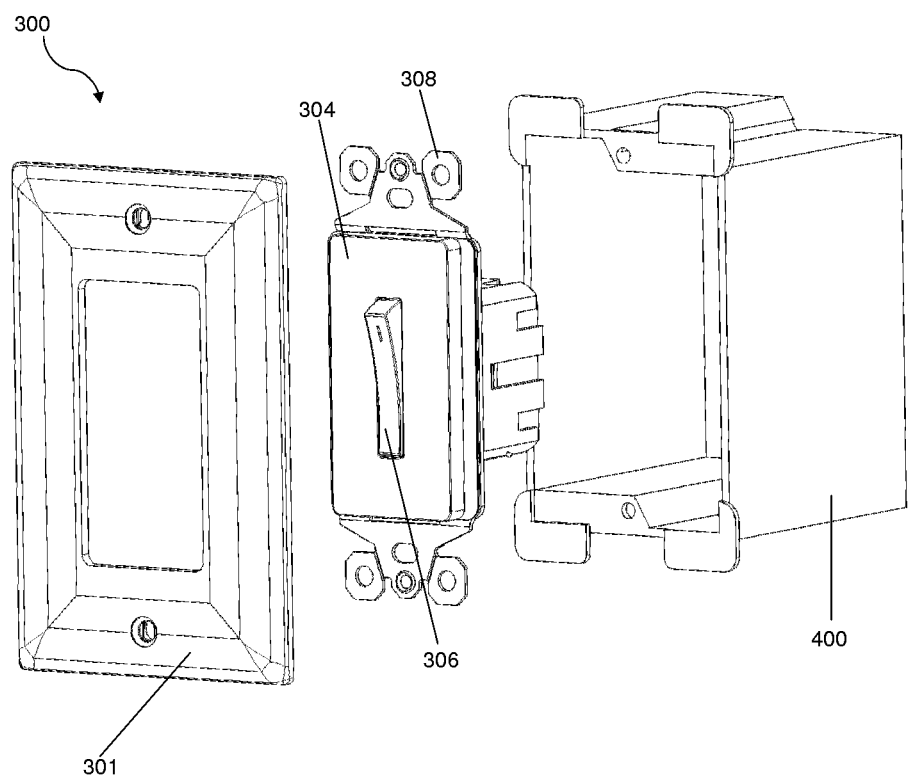
FIG. 18 is an exploded view the switch device in accordance with another embodiment of the present invention.

Referring to FIG. 15A-B, perspective front and rear views of the switch device 200 in accordance with another embodiment of the present invention is disclosed. FIG. 15A provides a perspective front view of a dimmer switch device 200. Device 200 is similar to other embodiments of the invention except it additionally includes a dimmer feature that allows the user to regulate the amount of AC power provided by the device to an electrical load. Aesthetic cover 202 is similar to frame enclosure 102 except there is a slot or cutaway 202-12 to accommodate a dimmer function. The user operates actuator knob 206-2 to regulate the power. Since actuator knob 206-2 is movable within a slot 202-12, this type of actuator is referred to as a slide actuator. Those skilled in the art will appreciate that there are other types of dimmer actuators including rotary, push button, or touch switch actuators that are within the scope of the invention. The dimmer is thermally coupled to a heat sink 214 that includes holes 214-2 for fasteners (not shown) to mount the device directly to an electrical wall box 400 (see FIG. 18.) Afterwards, a wall plate 301 as shown in FIG. 18 is attached to device 200 to complete the installation. Alternatively, device 200 may be coupled to frame 10 (when disposed in the form factor shown in FIGS. 4A-4B) by way of snaps 204-2. Aesthetic cover 202 snap fits to heat sink 214. Similarly to aesthetic cover 102, aesthetic cover 202 is removable.

Figure 16:
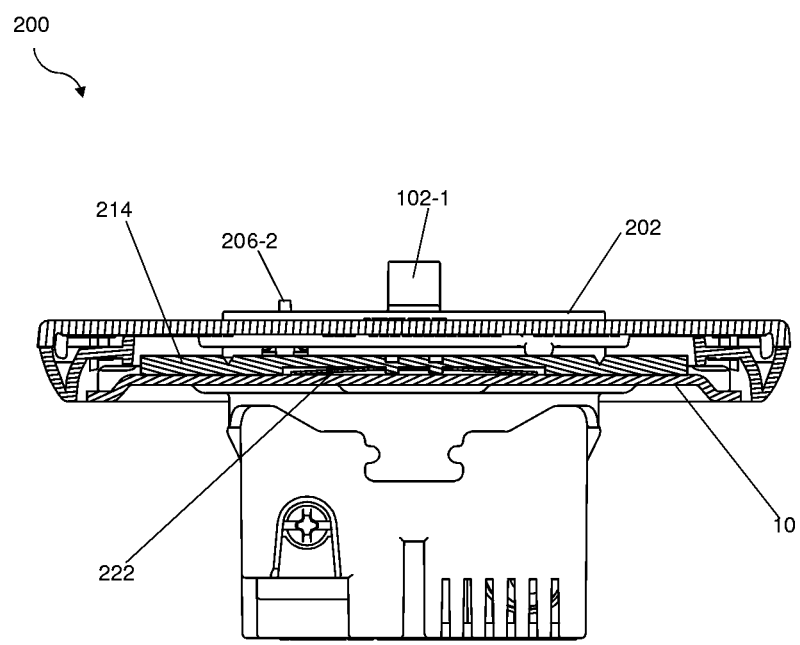
FIG. 16 is side view of the switch device depicted in FIGS. 15A-15B.

Referring to FIG. 16, dimmer switch device 200 is shown as being mounted to frame 10 as a 3-module device instead of directly to the wall box. This time device 200 is mounted to frame 10 which in turn mounts the device to the wall box. Heat sink 214 includes a ground clip 222 that electrically grounds the heat sink to frame 10 once the device is mounted. Similarly a thermally conductive member or material may be disposed between the heat sink and the frame so that the frame 10 functions as an ancillary heat sink.

Figure 17:
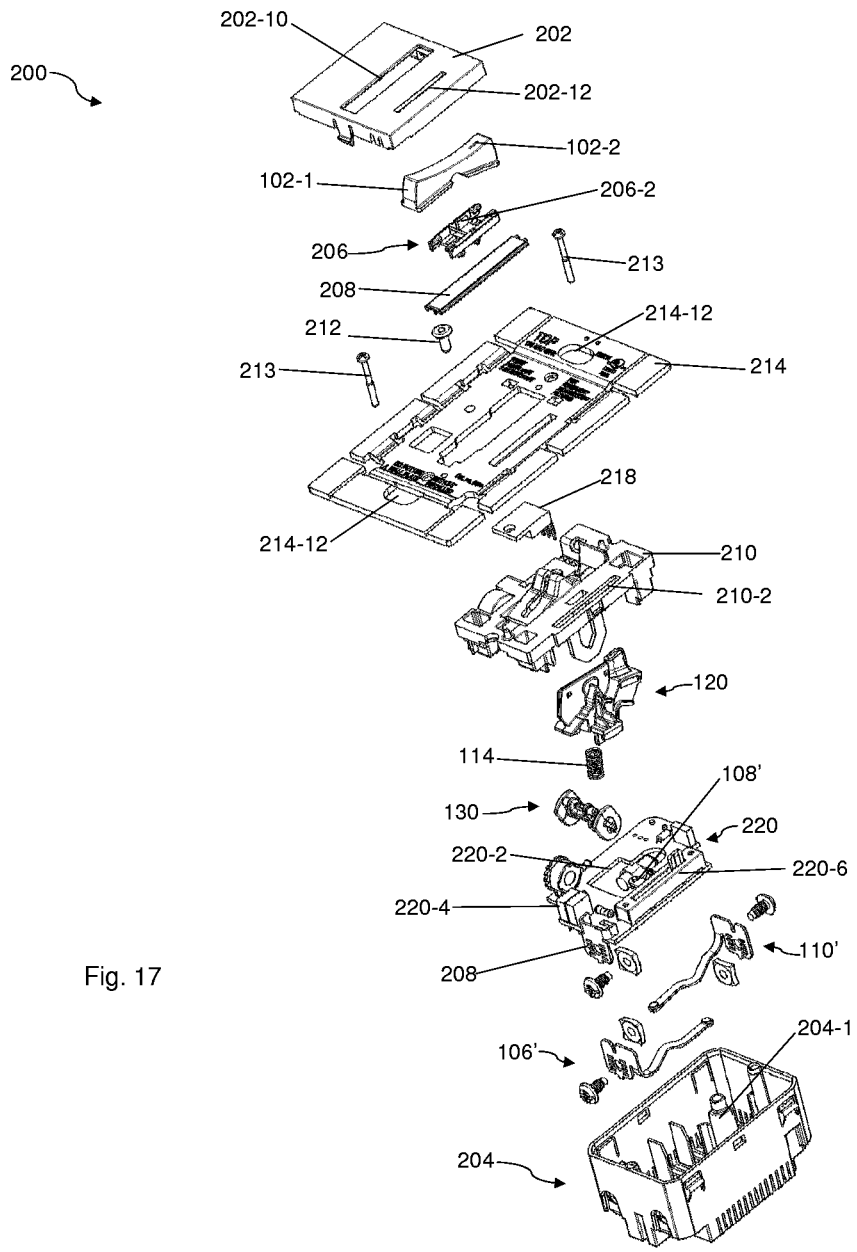
FIG. 17 is an exploded view of the switch device depicted in FIG. 15.

Referring to FIG. 17, an exploded view of dimmer switch 200 is shown. The dimmer further includes a triac 218 that is thermally coupled to heat sink 214 by way of rivet 212. Heat sink 214 is attached to back body 204 by way of fasteners 213. Actuator 206 (with integral actuator control knob 206-2) is coupled to slide potentiometer 220-6 disposed on printed circuit board 220. Other electronic components 220-4 associated with the dimmer are also disposed on printed circuit board (PCB) 220. For a more complete description of a dimmer circuit, U.S. patent application Ser. No. 13/584,501 is hereby incorporated by way of reference in its entirety. The hot contact terminal is subdivided between a terminal portion 208 and a contact arm portion 108' for retaining the fixed contacts. The two portions are electrically coupled by triac 218. The terminal portion 208 and the traveler terminals (106,110) are soldered to PCB 220. PCB 220 also includes an interrupted area 220-2 that allows the functional acutator120 and gear actuator 130 freedom to rotate.

Referring to FIG. 18, a view of the switch device 400 in accordance with another embodiment of the present invention is disclosed. In FIG. 18, the switch device is configured in a standard wiring device form factor. The frame enclosure 304 is implemented in a rectangular design that conforms to the rectangular shape of a conventional wall plate 301. Another difference between this embodiment and the previous embodiments relates to the mounting ears 308 coupled to the frame enclosure 304. The mounting ears 308 typically include a ground terminal configured to secure a ground conductor thereto. The mounting ears are employed of course, to mount the device 300 directly to the device box 400. Once the device 300 is mounted to the device box 400, the cover plate 301 is disposed overtop to complete the enclosure. The other components employed in switch device 300 are similar to those used in previous embodiments.

Figure 19:
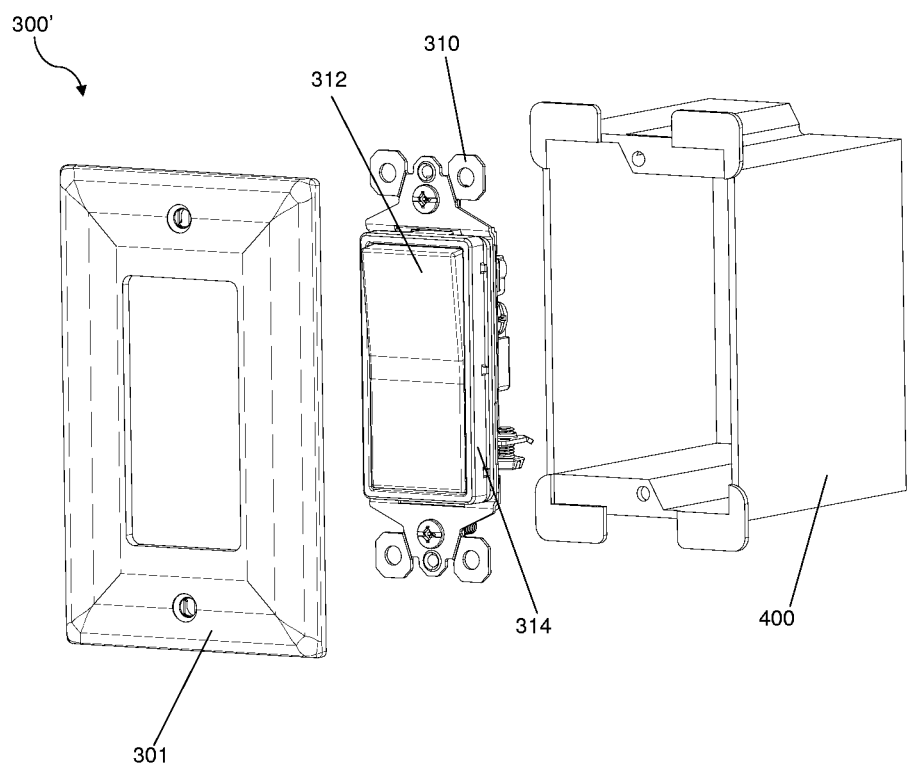
FIG. 19 is an exploded view the switch device in accordance with yet another embodiment of the present invention.

Referring to FIG. 19, a view of the switch device 300' in accordance with another embodiment of the present invention is disclosed. This embodiment is similar to embodiment 300 shown in FIG. 18, the exception being that frame enclosure 314 has a different opening to accommodate the paddle actuator 312 (which is larger than actuator 102-1). Paddle actuator 312 occupies a substantial portion of the front surface of frame enclosure 314. The other components employed in switch device 300' are similar to those used in previous embodiments.

Figure 20:
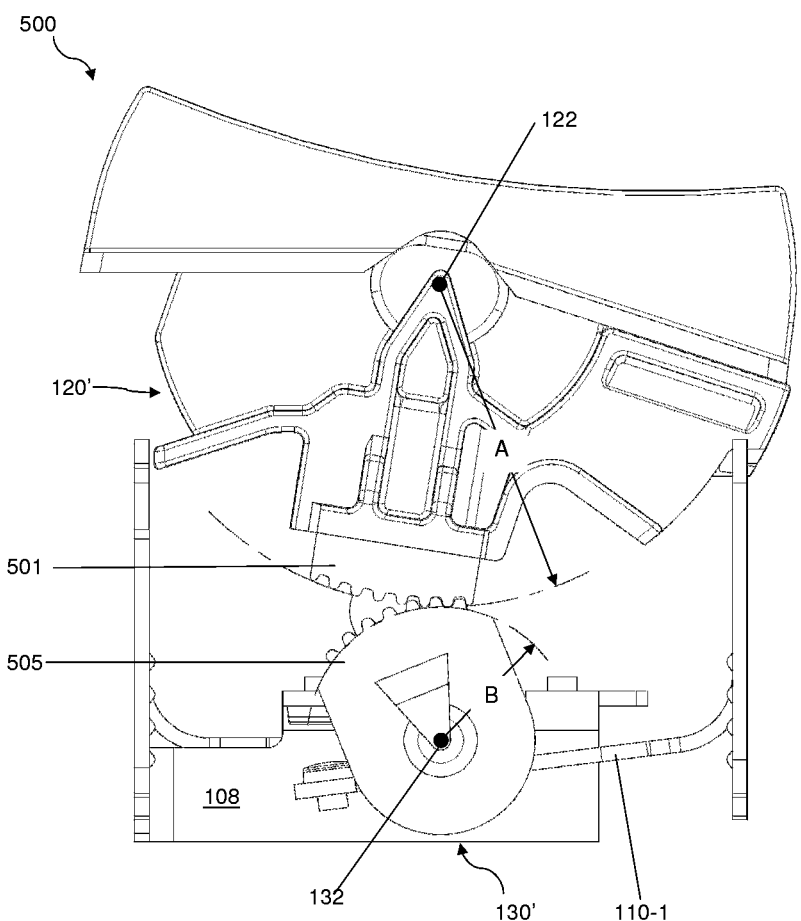
FIG. 20 is a diagrammatic depiction of the switch mechanism as an alternative to the one shown in FIG. 6.

As embodied herein and depicted in FIG. 20, a diagrammatic depiction of an alternate switch mechanism 500 is shown. Switch actuator 120' and multiplier 130' include toothed interface surfaces 501 and 505 respectively. The teeth are configured to mesh with each other as the switch mechanism is rotated. The pin and slot arrangement (126,132) that was relied upon to prevent slippage between the two parts is omitted since the gear teeth serve that purpose. In another embodiment of the invention (not shown) interface surfaces (501,505) are smooth and a pin and slot arrangement (126, 132) is included to prevent slippage. However, this time pin(s) 126 are situated on multiplier 130 at or near the interface surface 505. Thus as switch mechanism 500 is rotated, the length of arm "A" is substantially fixed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A switch device comprising:
  a housing comprising a switch frame and a back body portion;
  a first switch portion coupled to a first fixed axis of rotation, the first switch portion being configured to rotate a first angular amount in a first direction about the first fixed axis of rotation in response to a user actuation of the first switch portion, the first switch portion further including an interface portion, the distance between the first fixed axis of rotation and the interface portion defining a first pivot arm length;
  a second switch portion coupled to the interface portion and coupled to a second fixed axis of rotation, the second switch portion being configured to rotate a second angular amount in a second direction about the second fixed axis of rotation in response to the rotation of the first switch portion, the distance between the second fixed axis of rotation and the interface portion defining a second pivot arm length, the second angular amount being greater than the first angular amount and a function of the first pivot arm length and the second pivot arm length; and
  a set of switch contacts including at least one fixed contact and a movable contact, the movable contact being separated from the at least one fixed contact by a predetermined minimum distance in response to a camming element disposed on the second switch portion rotating in the second direction, the predetermined minimum distance being a function of the first pivot arm length and the second pivot arm length.

2. The device of claim 1, wherein the interface portion includes a laterally movable axis of rotation at an end thereof, the distance between the first fixed axis of rotation and the laterally movable axis of rotation defining the first pivot arm length.

3. The device of claim 2, wherein the laterally movable axis of rotation includes a slot arrangement disposed in the first switch portion and at least one pin disposed on the second switch portion configured to slide within the slot arrangement as the first switch portion is rotated.

4. The device of claim 1, wherein the interface portion includes a spring element that urges the length of the first pivot arm to vary in response to the user actuation.

5. The device of claim 1, wherein the first pivot arm length is a substantially fixed length as the first pivot arm rotates in response to the user actuation.

6. The device of claim 5, wherein the interface portion includes gear teeth configured to mesh with corresponding teeth disposed in the second switch portion.

7. The device of claim 5, wherein the interface portion includes a slot arrangement disposed in the first switch portion driving the rotation of the second switch portion by way of at least one pin that rotates inside the slot arrangement.

8. The device of claim 1, further including a spring coupled between the first switch portion and the second switch portion, the spring being configured to urge the second switch portion into either of two switch positions in response to the user actuation.

9. The device of claim 1, wherein the housing further comprises a hot terminal configured to be coupled to a source of AC power and at least one traveler terminal configured to be coupled to an electrical load, the hot terminal being coupled to the at least one fixed contact and the at least one traveler terminal being coupled to the movable contact.

10. The device of claim 9, wherein the movable contact is disposed on a cantilever arm connected to the at least one traveler terminal, the cantilever arm being characterized by a spring force biased to the closed position wherein the at least one fixed contact and the movable contact are electrically continuous.

11. The device of claim 10, wherein the second switch portion includes a cam element, the cam element being configured to engage the cantilever arm when the second switch portion is being rotated in the second direction such that the movable contact is separated from the at least one fixed contact.

12. The device of claim 1, wherein the switch frame is configured to complete enclosure of the device when coupled to the back body portion.

13. The device of claim 1, wherein the first switch portion is coupled to the switch frame at the first fixed axis of rotation such that the first pivot arm extends within the housing.

14. The device of claim 13, wherein the second switch portion is coupled to the switch frame at the second fixed axis of rotation.

15. The device of claim 13, wherein the interface portion includes a laterally movable axis of rotation.

16. The device of claim 1, wherein the back body portion includes a channel formed in a rear wall thereof, the channel being configured to accommodate a lighting element therein, the lighting element including a light emitting portion configured to extend into a portion of the switch frame when the lighting element is fully inserted into the channel.

17. The device of claim 16, wherein the switch frame includes a light funnel portion disposed in optical communication with the channel, the light funnel being configured to direct light emitted by the light emitting portion into a lens element.

18. The device of claim 17, wherein the lens element is formed in a user accessible switch actuator.

19. The device of claim 1, wherein the user accessible switch actuator is a paddle switch configured to be disposed on a portion of the switch frame.

20. The device of claim 1, further comprising:
an aesthetic cover portion configured to be coupled to the switch frame, the aesthetic cover portion including an opening, a functional switch portion of the first switch portion extending through the opening when the aesthetic cover portion is coupled to the switch frame; and
an aesthetic switch actuator configured to be coupled to the functional switch portion.

21. The device of claim 20, wherein the aesthetic switch actuator includes a lens element formed on a surface thereof, the lens element being configured to direct light into an ambient environment surrounding the switch device.

22. The device of claim 1, further comprising a plurality of terminals at least partially disposed inside the housing including a hot terminal configured to be coupled to a source of AC power and at least one traveler terminal configured to be coupled to an electrical load, the at least one traveler terminal being coupled to the hot terminal by way of a power regulation circuit configured to regulate the amount of AC power being provided to the electrical load.

23. The device of claim 22, wherein the hot terminal is coupled to at least one fixed contact and the at least one traveler terminal is coupled to a movable contact disposed on a cantilever arm.

24. The device of claim 23, wherein the hot terminal, the at least one traveler terminal, or the regulation circuit are disposed on a printed circuit board coupled to the switch frame.

25. The device of claim 24, wherein the printed circuit board includes an opening to permit rotation of the first switch portion and the second switch portion.

26. The device of claim 1, wherein the second angular amount is proportional to a ratio of the first pivot arm length over the second pivot arm length.

27. The device of claim 26, wherein the second angular amount is substantially equal to first angular amount times the ratio of the first pivot arm length over the second pivot arm length.

28. The device of claim 26, wherein the ratio of the first pivot arm length over the second pivot arm length is in a range substantially between about 2.0 to 2.5.

29. The device of claim 1, wherein the second angular amount is greater than about 40 degrees.

30. The device of claim 1, wherein the first angular amount is less than about 20 degrees.

31. A system including the switch device of claim 1, the system comprising:
a frame configured to be mounted to a device wall box, the frame including a first edge formed around a peripheral portion of the frame, the first edge being configured to abut a structural surface disposed around the device wall box, the frame assembly further including a frame opening corresponding to at least one gang opening, the frame opening substantially defining a second edge configured to extend inwardly toward the device wall box interior such that the frame opening provides sole access to the device wall box interior; and
the switch device of claim 1, the device being configured to be coupled within the frame opening to complete the system enclosure such that the device wall box interior is substantially inaccessible.

32. The system of claim 31, further comprising an aesthetic overlay configured to be removably coupled to the frame assembly, the aesthetic overlay including an overlay opening configured to provide access to at least a portion of the cover assembly.

33. The device of claim 1, further comprising a ground strap including external mounting elements disposed at either end thereof, the ground strap being configured to couple the switch device to a device box.

34. A switch device comprising:
a housing including a hot terminal configured to be coupled to a source of AC power and at least one traveler terminal configured to be coupled to an electrical load;
a switch input mechanism coupled to the housing at a first fixed axis of rotation, the switch input mechanism being configured to rotate a first angular amount in a first direction about the first fixed axis of rotation in response to a user actuation of the switch input mechanism, the switch input mechanism further including an interface portion disposed at an end thereof, the distance between the first fixed axis of rotation and the interface portion defining a first pivot arm length;
a switch actuator coupled to the switch input mechanism at the interface portion and coupled to the housing at a second fixed axis of rotation, the switch actuator being configured to rotate a second angular amount in a second direction about the second fixed axis of rotation in response to the rotation of the switch input mechanism, the distance between the second fixed axis of rotation and the interface portion defining a second pivot arm length, the second angular amount being greater than the first angular amount and a function of the first pivot arm length and the second pivot arm length; and
a set of switch contacts including at least one fixed contact coupled to the hot terminal and a movable contact connected to the at least one traveler terminal, the movable contact being separated from the at least one fixed contact by a predetermined minimum distance in response to a cam element disposed on the switch actuator rotating in a second direction, the predetermined minimum distance being a function of the first pivot arm length and the second pivot arm length.

35. The device of claim 34, wherein the movable contact is disposed on a cantilever arm connected to the at least one traveler terminal, the cantilever being characterized by a spring force biased to the closed position wherein the at least one fixed contact and the movable contact are electrically continuous.

36. The device of claim 35, wherein the cam element being configured to engage the cantilever arm when the switch actuator is being rotated in the second direction such that the movable contact is separated from the at least one fixed contact.

37. The device of claim 34, wherein the housing includes a back body portion and a switch frame, the switch frame being configured to complete enclosure of the device when coupled to the back body portion.

38. The device of claim 34, wherein the switch input mechanism is coupled to the switch frame at the first fixed axis of rotation such that the first pivot arm extends within the switch enclosure.

39. The device of claim 34, wherein the switch actuator is coupled to the switch frame at the second fixed axis of rotation.

40. The device of claim 34, wherein the interface portion includes a laterally movable axis of rotation.

41. The device of claim 34, further comprising: an aesthetic cover portion configured to be coupled to the switch frame, the aesthetic cover portion including an opening, a functional switch portion of the switch input mechanism extending through the opening when the aesthetic cover portion is coupled to the switch frame; and an aesthetic switch actuator configured to be coupled to the functional switch portion.

42. The device of claim 41, wherein the aesthetic switch actuator includes a lens element formed on a surface thereof, the lens element being configured to direct light into an ambient environment surrounding the switch device.

43. The device of claim 34, wherein the second angular amount is proportional to a ratio of the first pivot arm length over the second pivot arm length.

44. The device of claim 34, wherein the second angular amount is substantially equal to the first angular amount times the ratio of the first pivot arm length over the second pivot arm length.

45. The device of claim 44, wherein the ratio of the first pivot arm length over the second pivot arm length is in a range substantially between about 2.0 to 2.5.

46. The device of claim 34, wherein the second angular amount is greater than about 40 degrees.

47. The device of claim 34, wherein the first angular amount is less than about 20 degrees.

48. A system including the switch device of claim 34, the system comprising: a frame configured to be mounted to a device wall box, the frame including a first edge formed around a peripheral portion of the frame, the first edge being configured to abut a structural surface disposed around the device wall box, the frame assembly further including a frame opening corresponding to at least one gang opening, the frame opening substantially defining a second edge configured to extend inwardly toward the device wall box interior such that the frame opening provides sole access to the device wall box interior; and the switch device of claim 34, the device being configured to be coupled within the frame opening to complete the system enclosure such that the device wall box interior is substantially inaccessible.

49. The system of claim 48, further comprising an aesthetic overlay configured to be removably coupled to the frame assembly, the aesthetic overlay including an overlay opening configured to provide access to at least a portion of the cover assembly.

50. The device of claim 34, further comprising a ground strap including external mounting elements disposed at either end thereof, the ground strap being configured to couple the switch device to a device box.

* * * * *